(12) United States Patent
Takayama et al.

(10) Patent No.: US 11,052,800 B2
(45) Date of Patent: Jul. 6, 2021

(54) SEAT CORE MATERIAL

(71) Applicant: JSP CORPORATION, Tokyo (JP)

(72) Inventors: Atsuo Takayama, Tochigi (JP); Keiichi Hashimoto, Tochigi (JP); Katsunori Hisamatsu, Tochigi (JP)

(73) Assignee: JSP CORPORATION, Tokyo (JP)

( * ) Notice: Subject to any disclaimer, the term of this patent is extended or adjusted under 35 U.S.C. 154(b) by 1 day.

(21) Appl. No.: 16/486,269

(22) PCT Filed: Feb. 15, 2018

(86) PCT No.: PCT/JP2018/005240
§ 371 (c)(1),
(2) Date: Aug. 15, 2019

(87) PCT Pub. No.: WO2018/151208
PCT Pub. Date: Aug. 23, 2018

(65) Prior Publication Data
US 2020/0238870 A1    Jul. 30, 2020

(30) Foreign Application Priority Data

Feb. 17, 2017    (JP) .............................. JP2017-028108

(51) Int. Cl.
*B60N 2/70*    (2006.01)

(52) U.S. Cl.
CPC .................................. *B60N 2/7017* (2013.01)

(58) Field of Classification Search
None
See application file for complete search history.

(56) References Cited

U.S. PATENT DOCUMENTS

| | | | |
|---|---|---|---|
| 2002/0003366 A1* | 1/2002 | Fourrey | B60N 2/70 297/284.1 |
| 2005/0060809 A1* | 3/2005 | Rogers | A61G 7/05769 5/713 |

(Continued)

FOREIGN PATENT DOCUMENTS

| | | |
|---|---|---|
| JP | 4-84040 | 7/1992 |
| JP | 2011-45629 | 3/2011 |

(Continued)

OTHER PUBLICATIONS

International Search Report dated Mar. 27, 2018 in International Application No. PCT/JP2018/005240.

*Primary Examiner* — David E Allred
(74) *Attorney, Agent, or Firm* — Wenderoth, Lind & Ponack, L.L.P.

(57) ABSTRACT

A seat core material of the present invention is a seat core material for vehicle including a thermoplastic resin expanded bead article and a frame member embedded in a peripheral edge portion of the expanded bead article. The frame member includes a front frame part, a rear frame part, and two side frame parts interconnecting the front frame part and the rear frame part. Slits crossing the two side frame parts are formed along a longitudinal direction with continuous parts left intact outside the side frame parts on both ends of the expanded bead article. The slit penetrates or does not penetrate the expanded bead article in a thickness direction. The continuous parts are formed in a curved shape or a bent shape.

10 Claims, 9 Drawing Sheets

(56) References Cited

U.S. PATENT DOCUMENTS

| | | | | |
|---|---|---|---|---|
| 2010/0194171 A1* | 8/2010 | Hirata | ................ | B60N 2/01508 |
| | | | | 297/452.48 |
| 2010/0276979 A1* | 11/2010 | Zynda | ................ | B60N 2/42709 |
| | | | | 297/452.55 |
| 2016/0235206 A1* | 8/2016 | Piretti | ...................... | A47C 7/44 |
| 2017/0334106 A1 | 11/2017 | Sameshima et al. | | |
| 2019/0099002 A1* | 4/2019 | Murata | ................... | B29C 44/12 |
| 2019/0217759 A1* | 7/2019 | Sakakibara | .......... | B60N 2/7017 |

FOREIGN PATENT DOCUMENTS

| | | |
|---|---|---|
| JP | 2015-174340 | 10/2015 |
| WO | 2016/152530 | 9/2016 |

* cited by examiner (a)

(b)

SEAT CORE MATERIAL

TECHNICAL FIELD

The present invention relates to a seat core material for automobile seat.

BACKGROUND ART

In recent years, as a seat core material for automobile seat, there has been used a seat core material in which an expanded bead article and a frame member are integrated such that the frame member made of a metal or the like is embedded in the expanded bead article. The frame member is embedded in the expanded bead article, as a member for attachment to a vehicle body or a member for reinforcement material in case of a collision.

The seat core material in which the frame member is embedded in the expanded bead article is produced as described below, for example. First, a frame member is arranged at a predetermined position in a mold cavity. Then, expanded beads are charged in the mold cavity and are fusion-bonded to each other by heating. That is, the frame member and the expanded beads are integrally formed to produce the seat core material.

The expanded bead article generally causes molding shrinkage after in-mold molding, and thus the shape of the expanded bead article becomes stable with smaller dimensions than the metal mold dimensions.

When the expanded bead article having such a shrinkage property and the frame member are integrally molded, the frame member may become deformed due to the shrinkage of the expanded bead article to cause a warp in the seat core material, mainly because the shrinkage ratio of the expanded bead article and the shrinkage ratio of the frame member are different. The seat core material cannot obtain the intended dimension accuracy, which causes a problem with a decrease in the accuracy of attachment of the seat core material to the vehicle.

As a measure for solving these problems with the seat core material for automobile seat, there has been proposed a method by which an expanded bead article is provided with dividing spaces to expose a frame member so that the parts of the expanded beads article divided by the dividing spaces independently shrink, thus achieving the size stability (for example, see Patent Literature 1).

CITATION LIST

Patent Literature

Patent Literature 1: WO2016/152530

SUMMARY OF INVENTION

Technical Problem

According to the proposition in Patent Literature 1, the expanded bead article is completely divided and thus the divided parts of the expanded bead article can shrink independently. However, the seat core material described in Patent Literature 1 lacks an overall sense of unity and may become bent or deformed at the time of handling.

The present invention is devised to solve the foregoing problems. An object of the present invention is to provide a seat core material excellent in a sense of unity between a frame member and an expanded bead article and a strength desired for the expanded bead article in which the expanded bead article becomes less deformed even when the frame member is embedded in and integrated with the foamed article compact and the expanded bead article is very excellent in dimension accuracy.

Solution to Problem

The present invention provides a seat core material described below.

<1> A seat core material for vehicle including a thermoplastic resin expanded bead article and a frame member embedded in a peripheral edge portion of the expanded bead article, wherein the frame member includes a front frame part, a rear frame part, and two side frame parts interconnecting the front frame part and the rear frame part, Slits crossing the two side frame parts are formed along a longitudinal direction with continuous parts left intact outside the side frame parts on both ends of the expanded bead article, the slit penetrates or does not penetrate the expanded bead article in a thickness direction, and the continuous parts are formed in a curved shape or a bent shape.

<2> The seat core material according to <1>, wherein the expanded bead article has an auxiliary slit penetrating or not penetrating in the thickness direction outside the side frame parts forward from longitudinal end portions of the slit.

<3> The seat core material according to <1> or <2>, wherein a ratio of opening area of the slit is 25% or less of a projection area of the expanded bead article in top view of the seat core material in a mounted state.

<4> The seat core material according to any one of <1> to <3>, wherein a non-penetrating part of the slit has an interconnecting part in which a bend or curved shape is repeatedly formed.

Advantageous Effects of Invention

The seat core material of the present invention is structured in which a frame member is embedded in and integrated with a expanded bead article, is unlikely to deform and is very excellent in dimension accuracy, and has a sense of unity and a strength desired for a seat core material.

BRIEF DESCRIPTION OF DRAWINGS

FIG. 3(A) is a cross-sectional view of a slit provided in the seat core material vertically to a perpendicular direction in a mounted state; FIG. 3(B) is a diagram of a slit with a parallelogram cross section; and FIG. 3(C) is a diagram of a slit with a trapezoidal cross section.

FIG. 4(A) illustrates a shape curved to a front side; FIG. 4(B) illustrates a shape curved to a rear side; and FIG. 4(C) illustrates a shape with cranks.

DESCRIPTION OF EMBODIMENTS

Figure 1:
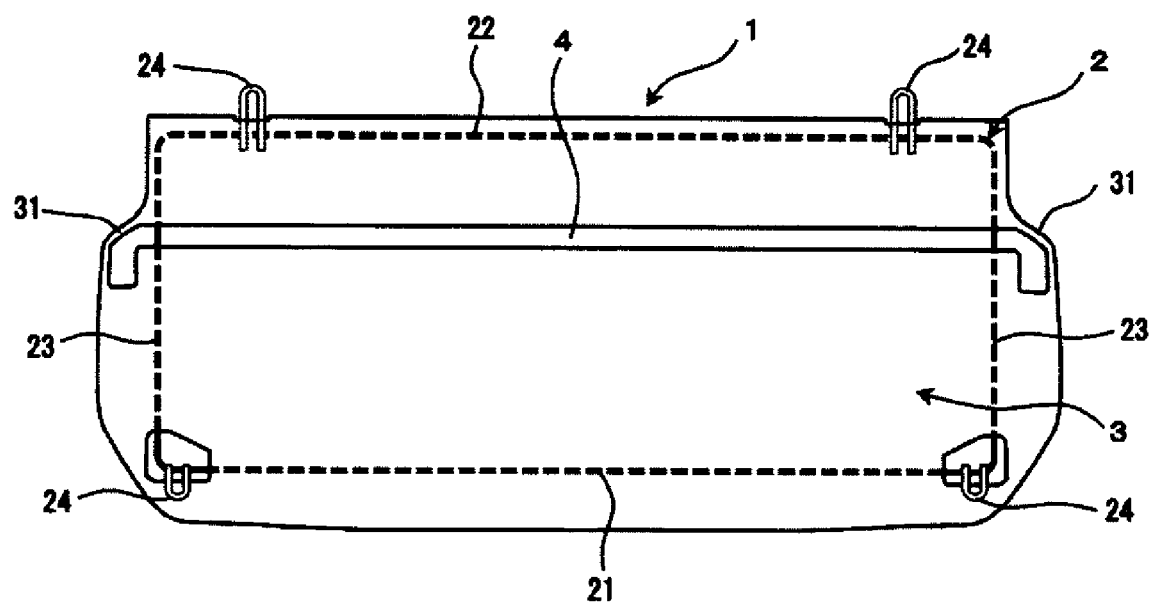
FIG. 1 is a diagram schematically illustrating an embodiment of a seat core material of the present invention.
Figure 9:
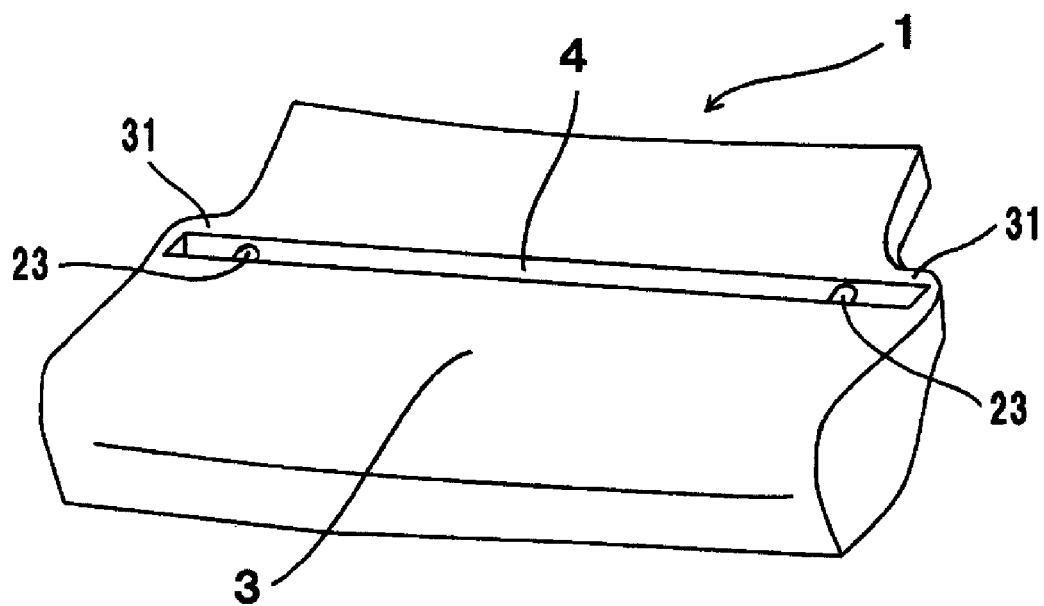
FIG. 9 is a schematic perspective view of an embodiment of a seat core material of the present invention.

A seat core material of the present invention will be described below in detail with reference to the diagrams. FIGS. 1 and 9 are diagrams illustrating an embodiment of the seat core material of the present invention.

A seat core material 1 of the present invention includes a thermoplastic resin expanded bead article 3 (hereinafter, also called expanded bead article 3) and a frame member 2 that is embedded in a peripheral edge part of the expanded bead article 3. The frame member 2 includes a front frame part 21, a rear frame part 22, and two right and left side frame parts 23 that interconnect the front frame part 21 and the rear frame part 22. The frame member 2 is preferably formed in an annular shape broadly along with the peripheral edge shape of the seat core material 1. The frame member 2 is preferably formed in an approximately rectangular shape or an approximately square shape as viewed from the top. The expanded bead article 3 has a slit 4 penetrating or not penetrating in a thickness direction and crossing the two side frame parts 23. The slit 4 is continuously or intermittently formed in a longitudinal direction outside the side frame parts 23 with continuous parts 31 left intact on both ends of the expanded bead article 3 (hereinafter, also called curved or bent parts 31). The continuous parts 31 on both ends of the expanded bead article 3 are formed in a curved shape or a bent shape.

The expanded bead article 3 can be molded by a thermoplastic resin. Examples of the thermoplastic resin comprising the expanded bead article 3 include polystyrene resin, polyolefin resins such as polyethylene and polypropylene, polyester resins such as polybutylene succinate, polyethylene terephthalate, and polylactic acid, and polycarbonate resins. In addition, examples of the thermoplastic resin comprising the expanded bead article 3 also include composite resins of polystyrene resins and polyolefin resins, mixtures of two or more of the foregoing resins, and others. Among them, polyolefin resins and composite resins of polystyrene resins and polyolefin resins are preferred from the viewpoints of light weight and strength. Among them, polyethylene resins and polypropylene resins are preferred, and polypropylene resins are more preferred. In addition, the expanded bead article 3 made from a thermoplastic resin including crystalline resins such as polyethylene and polypropylene tends to shrink after molding, which makes it easy to obtain the advantageous effects of the present invention.

The foamed particles made from the thermoplastic resin as a material for the expanded bead article 3 is preferably multi-layer foamed particles, from the viewpoint of adhesion between a urethane and the seat core material 1 used together for a seat. For example, the foamed particles have a multi-layer structure of a foamed core layer and a covering layer covering the foamed core layer and a resin excellent in adhesion to the urethane is used for the covering layer, thereby to further improve the adhesion between the obtained expanded bead article 3 and the urethane material. The multi-layer foamed particles may be polyolefin resin-based multi-layer foamed particles, for example, in which the foamed core layer is made from a polyolefin resin and the covering layer is made from a mixed resin of a polyolefin resin and a polystyrene resin and/or a polyester resin. Among them, preferably, the covering layer is made from a polyolefin resin (A) and a polystyrene resin and/or a polyester resin (B), and the weight ratio of A to B is 15:85 to 90:10.

The expanded bead article 3 is formed by molding the thermoplastic resin foamed particles in a molding mold. The foamed particles can be produced by a publicly known general method for producing this kind of foamed particles. For example, to produce the propylene resin foamed particles, first, resin particles are dispersed in a necessary amount of dispersion medium (in general, water) by adding a surface active agent as desired to the dispersion medium in an airtight container that can be pressurized such as an autoclave. Then, the dispersion medium with the resin particles dispersed is stirred while heating and a foaming agent is fed into the resin particles to impregnate the resin particles with the foaming agent. Then, the container is held for a predetermined time while heating to form secondary crystal of the resin particles. After that, the resin particles impregnated with the foaming agent are released together with the dispersion medium from the container under high-temperature conditions to a low-pressure area (in general, under atmospheric pressure) to make the resin particles expand. In this manner, the expanded beds are obtained.

The compact density of the expanded bead article 3 is preferably 0.015 to 0.3 g/cm$^3$. The lower limit of the compact density of the expanded bead article 3 is more preferably 0.025 g/cm$^3$ and further preferably 0.03 g/cm$^3$ from the viewpoint of making the seat core material 1 excellent in strength and lightweight properties. The upper limit of the compact density of the expanded bead article 3 is more preferably 0.1 g/cm$^3$ and further preferably 0.08 g/cm$^3$. In the case of using the expanded bead article 3 made from a polyolefin resin, the lower limit of the compact density is preferably 0.018 g/cm$^3$ and more preferably 0.020 g/cm$^3$. In the case of using the expanded bead article 3 made from a polyolefin resin, the upper limit of the compact density is preferably 0.07 g/cm$^3$ and more preferably 0.06 g/cm$^3$. The lower the compact density of the expanded bead article 3 is, the greater the shrinkage amount of the expanded bead article 3 becomes, which makes it easy to exert the advantageous effects of the present invention.

In addition, a plurality of expanded bead articles 3 different in apparent density may be combined to form one expanded bead article 3. In this case, the average apparent density of all the expanded bead articles 3 falls within the numerical range described above. The apparent density used here can be determined by a submersion method by which the expanded bead article 3 is measured in a state of being submerged in water.

Examples of a material for the frame member 2 include metals such as iron, aluminum, and copper, and resins. From the viewpoint of improving the strength of the seat core material 1, a metal is preferred and in particular a steel material is preferred. The frame member 2 can have an arbitrary shape such as a linear shape, a tubular shape, and a bar shape. Among them, a bar-shaped or linear-shaped wire material with a diameter of 2 to 8 mm is preferred. The diameter of the wire material is more preferably 3 to 7 mm.

Further, the tensile strength of the wire material is preferably 200 N/mm$^2$ or more, and is more preferably 250 to 1300 N/mm$^2$, from the viewpoint of improving the strength of the seat core material 1. The yield point of the wire material is preferably 400 N/mm$^2$ or more, further preferably 440 N/mm$^2$ or more. The physical properties of the wire material can be measured in accordance with JIS G3532. The frame member 2 can be formed in an annular shape by welding or bending the foregoing material.

The frame member 2 does not necessarily need to be formed from only a wire material but wire materials may be interconnected by a metallic plate or the like, for example, to form an annular frame. The annular frame member 2 preferably has an approximately rectangular shape or an approximately square shape as a basic structure. However, the frame member 2 can be formed such that the long side or short side portions are bent or corner portions are cut according to the seat core material 1 or the shape of the attachment portion.

Figure 2:
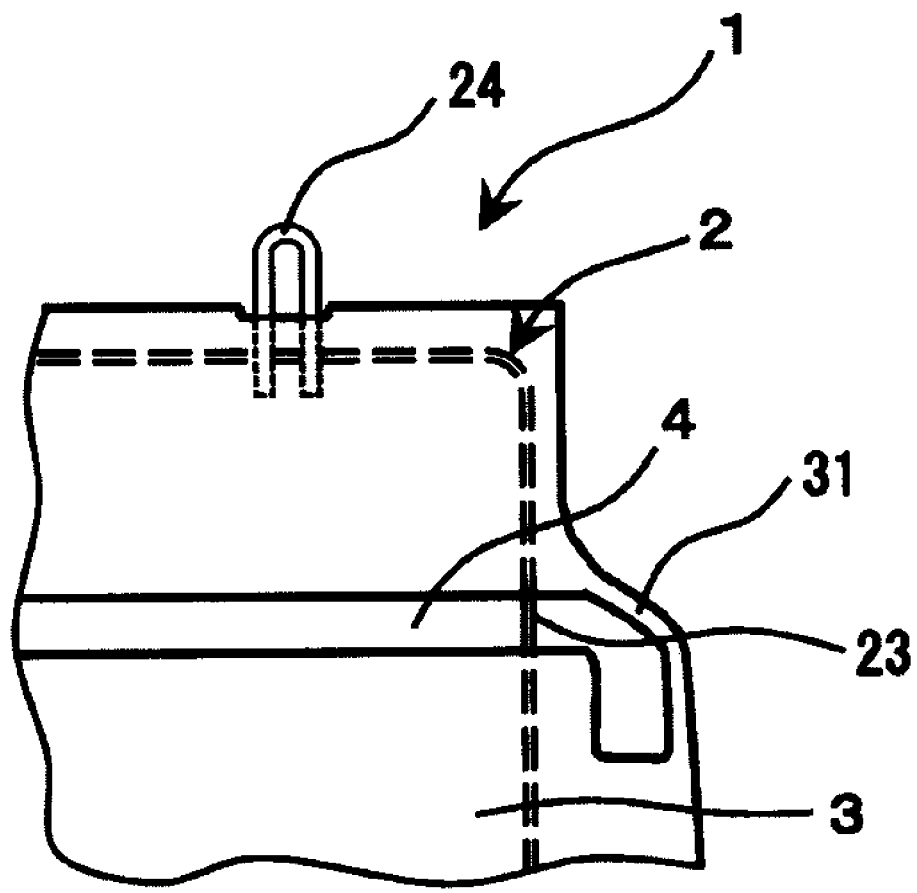
FIG. 2 is a partially enlarged schematic view of an embodiment of a curved shape of a continuous part.

The frame member 2 is embedded in and integrated with the expanded bead article 3 and is used for improvement of the strength of the seat core material 1 and for attachment to the vehicle body. In the seat core material 1 of the present invention, as illustrated in FIG. 2, the frame member 2 including the front frame part 21, the rear frame part 22, and the right and left side frame parts 23 interconnecting the front frame part 21 and the rear frame part 22, is embedded into the expanded bead article 3. The frame member 2 is preferably annular in shape.

The foregoing term "embedded" means that the frame member 2 is integrated in the expanded bead article 3. The integration includes not only a state in which the frame member 2 is closely surrounded by the expanded bead article 3 but also a state in which the frame member 2 is surrounded by the expanded bead article 3 with an air gap (or space) left partially or entirely around the frame member 2. The entire axial length of the frame member 2 does not necessarily need to be embedded in the expanded bead article 3 but a portion of the frame member 2 may be exposed to outside from the expanded bead article 3, for example, as illustrated in FIG. 2. From the viewpoint of strength of the seat core material 1, the portion of the frame member 2 exposed from the expanded bead article 3 is preferably 50% or less of the entire length of the frame member 2, more preferably 30% or less.

The frame member 2 embedded in the expanded bead article 3 is restricted in motion by the expanded bead article 3 in a direction approximately perpendicular to both the shrinkage direction of the expanded bead article 3 and the axial direction of the frame member 2. Therefore, the frame member 2 is preferably embedded in the expanded bead article 3 in such a manner as to be movable with respect to the shrinkage of the expanded bead article 3. For example, when the shrinking force of the expanded bead article 3 applied to the frame member 2 acts mainly in the width direction of the seat core material, the frame member 2 is preferably sandwiched in the expanded bead article 3 at a position perpendicular to the width direction of the frame member 2. In addition, the frame member 2 is preferably embedded in the expanded bead article 3. Further, the frame member 2 is preferably supported by the expanded bead article 3 from the vertical direction. In a state in which the seat core material 1 is mounted in a vehicle such as an automobile, the front frame part 21 in the frame member 2 refers to a part of the frame member 2 that is equivalent to a front seat part on the front side of the automobile and the rear frame part 22 in the frame member 2 refers to a part of the frame member 2 that is equivalent to a rear seat part. In a state in which the seat core material 1 is mounted in a vehicle such as an automobile, the width direction refers to a right-left direction of the automobile and will also be called simply longitudinal direction or vehicle-width direction, and width direction. In a state in which the seat core material 1 is mounted in a vehicle such as an automobile, the vertical direction refers to a vertical low-top direction of the automobile, and is also called thickness direction.

The frame member 2 can have retainers 24 partially exposed from the expanded bead article 3 for mounting the seat core material 1 in an automobile vehicle body as illustrated in FIGS. 1 and 2. There is no particular limitation on the material for the retainers 24 but the material is preferably in general similar to the material for the frame member 2. The retainers 24 are preferably shaped to be easily hook on the vehicle body. Specifically, the retainers 24 are preferably U-shaped from the viewpoints of processability and installability.

The seat core material 1 of the present invention has the through or non-through slit 4 in the thickness direction of the expanded bead article 3. The slit 4 is formed to intersect with the two side frame parts 23. In the intersecting places between the side frame parts 23 and the slit 4, at least some portions of the side frame parts 23 are preferably exposed. The exposed portions may have not only a cross shape but also a T shape, for example. Further, as illustrated in FIG. 2 and others, preferably, the slit 4 penetrating in the thickness direction crosses the frame member 2 in a cross shape and the side frame parts 23 are fully exposed at the portions intersecting with the slit 4. The slit 4 is continuously or intermittently formed in the width direction with the continuous parts 31 left intact at both ends of the expanded bead article 3 outside the side frame parts 23. The left continuous parts 31 are formed in a curved shape or a bent shape in such a manner as to be stretchable along with the shrinkage of the expanded bead article 3.

In the seat core material 1 thicker at the front part and thinner at the rear part, the shrinkage amount of the seating portion of the front frame part 21 relatively large in the volume of the expanded bead article 3 is larger than that of the seating portion of the rear frame part 22. In addition, from the viewpoint of mounting in the vehicle, the front frame part 21 is embedded on the lower surface side of the seat core material 1 in a biased manner. Accordingly, after removal of the seat core material 1 from the molding mold, the expanded bead article 3 on the rear frame part 22 side is stretched along with the shrinkage of the expanded bead article 3 on the front frame part 21 side and the seat core material 1 is prone to deform in a V shape as a whole. In addition, the center of the rear-side end portion of the seat core material 1 is likely to deform to the front side. For example, on the rear frame part 22 side, the expanded bead article 3 deforms forward at width-wise end portions. The center portion of the expanded bead article 3 deforms forward more greatly than the end portions. Therefore, the seat core material 1 entirely deforms in a V shape as viewed from the top. When the frame member 2 is embedded in the thick front frame part 21 at a position leaning in a thickness direction, the direction of shrinkage becomes three-dimensional and the deformation of the seat core material 1 becomes further complicated. In the seat core material 1 of the present invention, in particular, a thickness $T_f$ of a front end portion of the seat core material 1 and a thickness $T_r$ of a rear end portion of the seat core material 1 are preferably in the relationship $T_r \times 1.5 < T_f$, further preferably $T_r \times 1.7 < T_f$.

According to the seat core material 1 of the present invention, forming the slit 4 in the width direction to intersect with the two side frame parts 23 makes it possible to mitigate the front-back shrinking force applied to the expanded bead article 3 in particular. In addition, the deformation of the seat core material 1 can be suppressed. In particular, it is possible to more effectively suppress the influence of shrinkage of the seat core material 1 thick at the front part and thinner at the rear part in the front-back direction after the molding. On the other hand, the slit 4 is preferably formed at least outside the side frame parts 23 of the expanded bead article 3. More preferably, the slit 4 is extended to the width-wise inside of the expanded bead article 3. In the extended slit formation portions, the slit 4 does not necessarily fully penetrate the expanded bead article 3 but may be partially groove-shaped.

Forming the slit 4 in the width direction with the continuous parts 31 of the expanded bead article 3 left intact outside the side frame parts 23 and forming the continuous parts 31 in a curved shape or a bent shape allows bending deformation of the continuous parts 31. This distributes the shrinking force of the expanded bead article 3 so that the continuous parts 31 can generate elastic action. In addition, the continuous parts 31 can effectively mitigate the shrinkage of the seat core material 1. Therefore, the seat core material 1 is excellent in a sense of unity between the frame member 2 and the expanded bead article 3 and has a sufficient strength.

There is no particular limitation on the formation positions of the bent or curved portions of the continuous parts 31. However, the bent or curved portions are preferably formed in a range from the front-back center portion of the expanded bead article 3 to the rear frame part 22. In addition, the continuous parts 31 are preferably formed at a portion of 50 to 90% from the front end portion of the expanded bead article 3 with respect to a front-back length (M) of the center portion of the expanded bead article 3, preferably at a portion of 60 to 80% from the front end portion of the expanded bead article 3. Forming the bent or curved portions of the continuous parts 31 within the foregoing range makes it possible to effectively mitigate the influence of shrinking force of the expanded bead article 3 on the front frame part 21 side, and to reduce the influence on the strength of the rising portion of the rear side likely to become deformed, so that the seat core material 1 can have a sense of unity.

Further specifically, as illustrated in FIG. 1, the seat core material 1 is shaped such that the width-wise length of the expanded bead article 3 is shorter on the rear side than on the front side for the purpose of installing a seat belt and the like in relation to the position of mounting the seat core material 1 in the vehicle body. The peripheral edge of the expanded bead article 3 is narrowed on the rear side. Forming the slit 4 and the continuous parts 31 in this narrowed area makes a bent or curved structure by the use of the narrowed shape of the peripheral edge of the seat core material 1. Further specifically, the slit 4 is preferably formed in the width direction in the narrowed part of the seat core material 1. An auxiliary slit penetrating or not penetrating the expanded bead article 3 in the thickness direction are preferably formed in the expanded bead article 3 outside the side frame parts 23 forward from the longitudinal outer end portions of the slit 4. Further, the auxiliary slit is preferably a slit formed in the vertical direction of the expanded bead article 3, and is more preferably a slit opened in the top or bottom of the expanded bead article 3 or a slit penetrating the expanded bead article 3 from the top surface to the bottom surface. Forming the slit 4 and the auxiliary slit makes it possible to form the continuous parts 31 at the peripheral edge of the expanded bead article with the both end portions of the expanded bead article 3 left intact outside the portions with the slit 4 and the auxiliary slit as seen in the vehicle-width direction. Specifically, it is preferred to form the auxiliary slit crossing the slit 4 in the front-back direction by the use of the narrowed shape at the width-wise outer end portions of the slit 4 and form the left end portions of the expanded bead article 3 in a bent or curved shape. Forming the auxiliary slit in the front-back direction at the width-wise outer end portions of the slit 4 makes the bent or curved shape of the continuous parts 31 more pronounced, thereby further suppressing the influence of shrinking force of the expanded bead article 3.

A minimum thickness (l) of each of the continuous parts 31 of the expanded bead article 3 is preferably 10 to 50 mm as seen in the vehicle-width direction. With the minimum thickness (l) in this range as seen in the vehicle-width direction, the bent or curved structure exerts elastic force by bending deformation to provide excellent strength. From the foregoing viewpoint, the minimum thickness (l) is further preferably 15 to 30 mm. The deflection amount of the expanded bead article 3 at the bending test of JIS K7221-2 (2006) is preferably 20 mm or more. The expanded bead article 3 satisfying the foregoing bending characteristics may be a polyolefin resin expanded bead article with a compact density of 0.018 to 0.07 g/cm$^3$.

The front-back length of each of the continuous parts 31 is preferably 50 to 200 mm, more preferably 60 to 180 mm such that the curved or bent part 31 is formed at the portion of the thickness (l). The front-back length of each of the continuous parts 31 is the total length of the slit 4 and the auxiliary slit provided as necessary, which can be measured along the peripheral edge of the expanded bead article.

Figure 3:
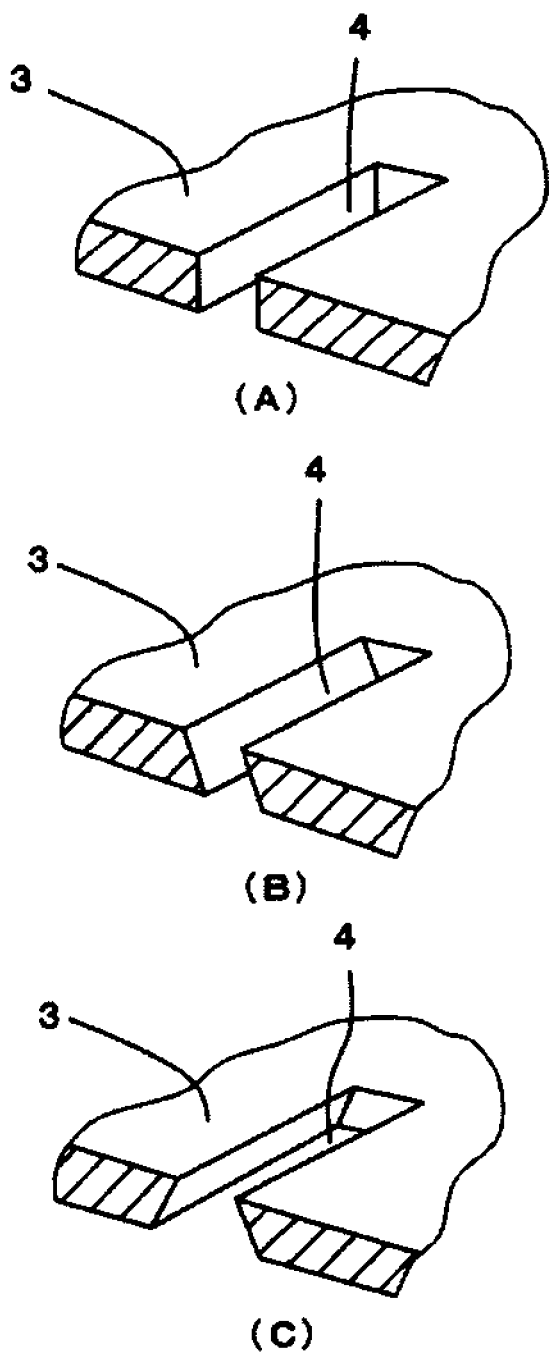
FIG. 3 is a cross-sectional view of a slit.

Further, the slit 4 can be formed such that side walls as seen in the seat core material width direction are made vertical to the perpendicular direction of the seat core material 1 in a mounted state as illustrated in FIG. 3(A) or can be formed in a penetrating direction inclined to the perpendicular direction of the seat core material 1 in a mounted state. Specifically, the slit 4 can have a parallelogrammatic cross section as illustrated in FIG. 3(B) or a trapezoidal cross section as illustrated in FIG. 3(C). In this manner, forming the slit 4 in the penetrating direction inclined with respect to the perpendicular direction of the seat core material 1 in a mounted state makes it possible to adjust the opening position and the opening area of the slit 4 on the top surface of the seat core material 1. In particular, forming the slit 4 with front-back side surfaces made parallel to each other is more preferably effective in distributing the front-back shrinking force and impact force in the vertical direction. The penetrating direction of the slit 4 refers to a line connecting the front-back center of the slit 4 at the slit opening portion from the top surface to the bottom surface.

In regard to a front-back length (m) of the slit 4 at the side frame parts 23, the slit 4 may be a simply cut slit 4 or a slit 4 with a front-back length (m) of about 100 mm. Further, the front-back length (m) of the slit 4 is preferably 5 to 50 mm from the viewpoint of strength of the seat core material 1. There is no particular limitation on the front-back length of the slit at the width-wise inner portion of the expanded bead article 3, and the slit 4 at the width-wise inner portion of the expanded bead article 3 may be connected to a penetrating space formed for the purpose of lightening or the like. Even in this case, the slit 4 outside the side frame parts 23 is preferably shaped as a slit with a front-back length of 10 to 50 mm.

The slit 4 can be formed using a tool such as a cutter in the expanded bead article immediately after the in-mold molding of the foamed particles and before shrinkage. The slit 4 can also be formed at the same time as the molding of the expanded bead article 3 by using a molding mold capable of forming the slit 4. In the case of forming the slit 4 by the molding mold, the front-back length (m) of the slit 4 is preferably 10 to 40 mm, more preferably 15 to 30 mm.

The opening area of the slit 4 is preferably 25% or less of the top-view projection area of the seat core material 1 in a mounted state of the present embodiment. Setting the opening area of the slit 4 in this range makes it possible to sufficiently prevent the deformation. From this viewpoint, the opening area of the slit 4 is preferably 1 to 20% of the top-view projection area, further preferably 5 to 20%. The opening area includes the opening area of the non-through slit 4. The opening area of the slit 4 does not include the opening area of the through auxiliary slit. The slit 4 preferably has a length of 100 mm or more from the outer end portion as seen in the vehicle-width direction, more preferably 200 mm or more. The slit 4 may be formed continuously in the vehicle-width direction.

Figure 4:
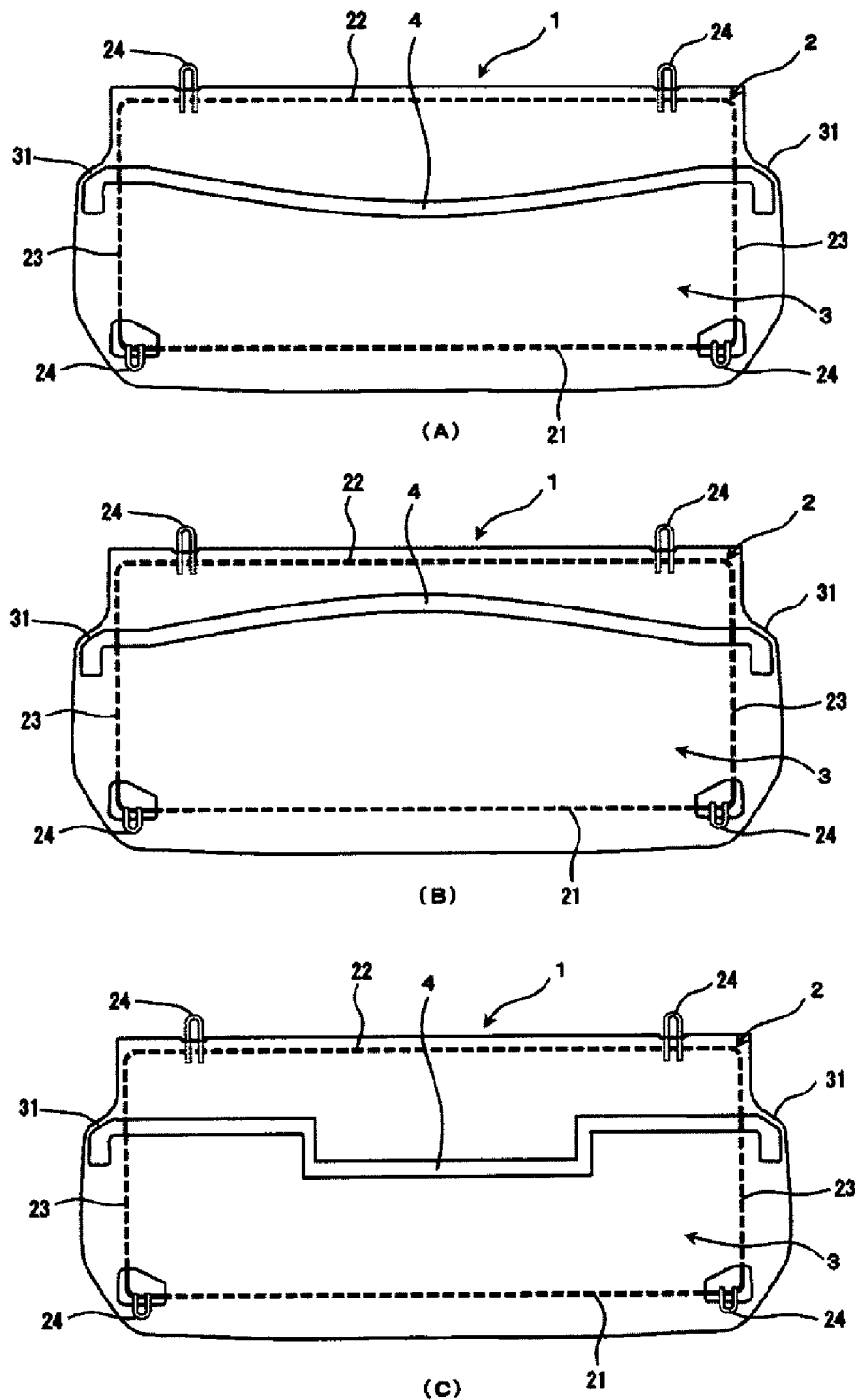
FIG. 4 is a schematic view of slit shapes.
Figure 8:
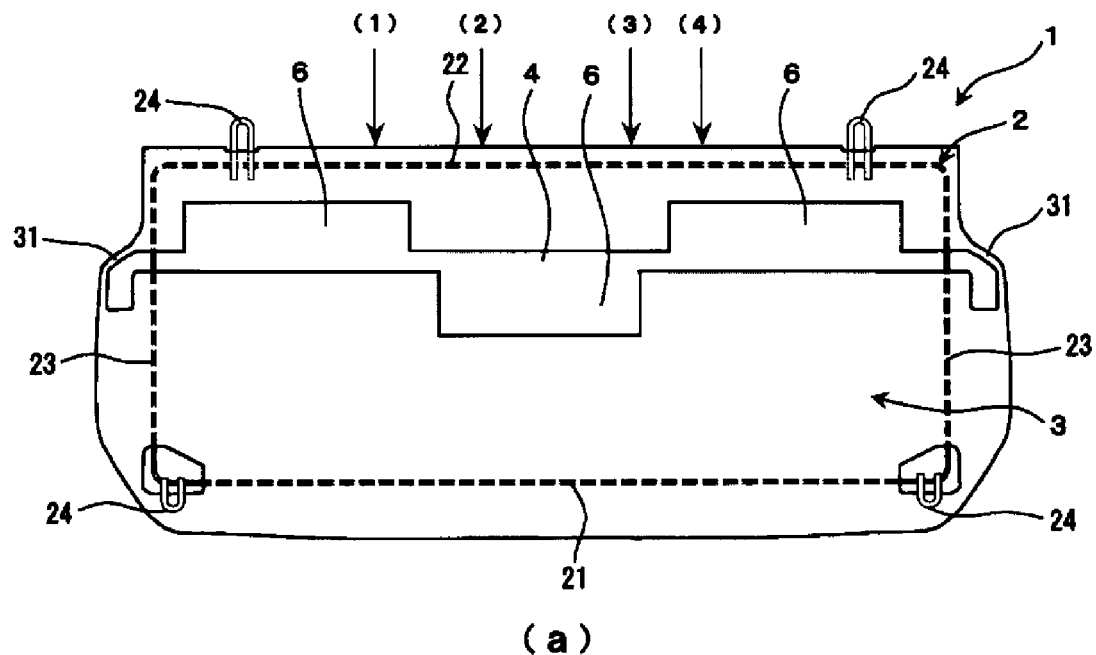
FIGS. 8(a) and 8(b) are schematic views of seat core materials used in examples.
Figure 8:
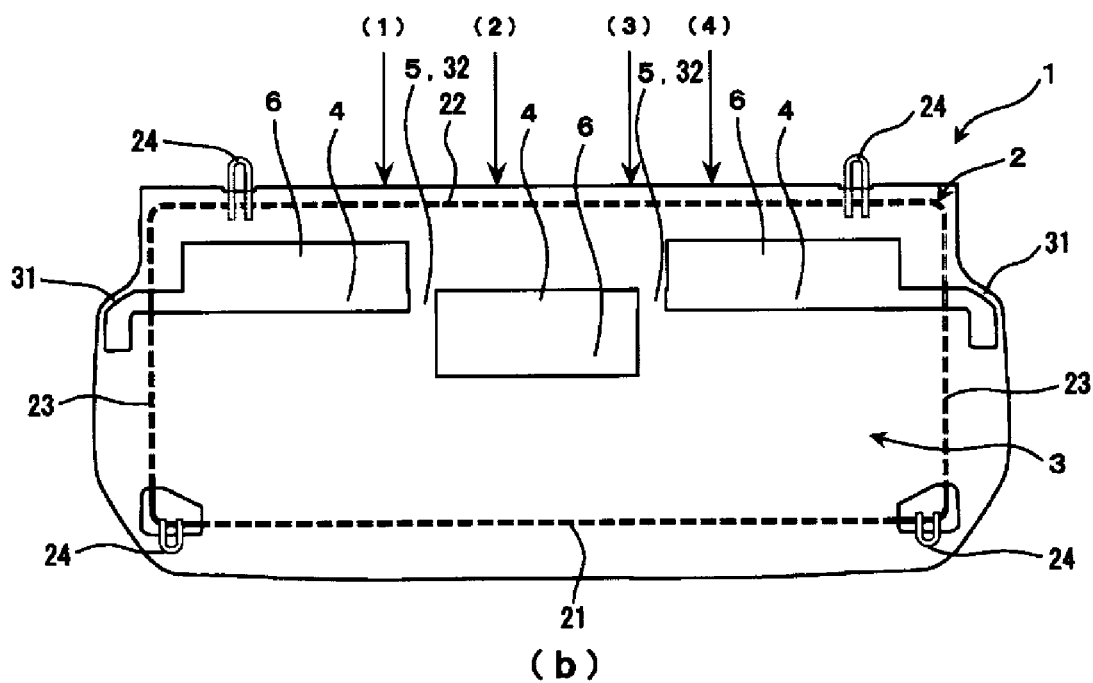

The shape of the slit 4 inside the seat core material 1 can be set as appropriate according to the shape of the seat core material 1. In top view of the seat core material 1, the shape of the slit 4 may be linear as seen in the width direction as illustrated in FIG. 1 or may be curved in an arc on the front side or the rear side as illustrated in FIG. 4(A) or 4(B). Alternatively, the shape of the slit 4 may have cranks as illustrated in FIG. 4(C). In the case of forming the fully continuous slit 4 as described above, the deformation amount of the seat core material 1 can be further reduced. On the width-wise inside of the seat core material 1, the slit 4 may be a concave portion or a portion connected to the penetrating space 6 formed for the purpose of lightening as illustrated in FIG. 8(*a*) or 8(*b*).

A length (l) of the slit 4 as seen in the vehicle-width direction (longitudinal direction) is preferably 50% or more of an entire length (L) of the expanded bead article 3 in the formation part of the slit 4 as seen in the vehicle-width direction, more preferably 70% or more, further preferably 80% or more. The upper limit is generally about 99%. The lengths L and l are obtained as described below. A straight line is drawn in the front-back center part of the both outer edge-side ends of the slit 4 in the vehicle-width direction of the expanded bead article 3, and the formation part of the slit 4 is set on the extension of the straight line. Then, the length L of the straight line between the both end portions of the expanded bead article 3 is measured. On the other hand, the length l of the slit 4 between the both end portions is calculated. When the slit 4 is intermittently formed but is in proximity to another slit or a through hole at a distance of about 5 to 100 mm and appears to overlap the other slit 4 in a forward view, the slit 4 is regarded as continuous in the vehicle-width direction and the slit length l is calculated.

In the seat core material 1 of the present invention, the slit 4 is preferably intermittently formed in the lateral-width direction between the side frame parts 23. Further preferably, interconnecting parts 5 are formed in non-penetrating parts 32 of the intermittent slit 4. The interconnecting parts 5 interconnect the front side and rear side of the expanded bead article 3 in a stretchable manner like a spring at the non-penetrating parts 32 of the intermittent slit 4.

In the seat core material 1 of the present embodiment, when the slit 4 is intermittently formed, the stretchable interconnecting parts 5 are provided at the non-penetrating parts 32 of the slit 4 in the lateral width direction. This makes it possible to absorb the shrinkage of the front side of the expanded bead article 3 relatively large in volume by the both ends of the interconnecting parts 5 deforming and widening forward and backward and to hold the sense of unity and rigid impression of the seat core material 1.

There is no particular limitation on the shape of the interconnecting parts 5 as far as the interconnecting parts 5 can interconnect the non-penetrating parts 32 of the slit 4 in a manner capable of stretching in the front-back direction. For example, each of the interconnecting parts 5 has a bent or curved portion and is entirely stretchable in the front-back direction by bending deformation of the bent or curved portion.

Specifically, the interconnecting parts 5 of the shapes illustrated in FIGS. 6(A) to 6(D) can be exemplified. Each of FIGS. 6(A) to 6(D) is a schematic perspective view of the interconnecting part 5 formed to stretch the non-penetrating part 32 of the intermittent slit 4, which illustrates a cross section of an embodiment of the interconnecting part 5 illustrated in FIG. 5 taken along line A-A. In each of the embodiments illustrated in FIGS. 6(A) to 6(C), the interconnecting part 5 is formed by alternately providing grooves on the top and bottom of the non-penetrating part 32 in the lateral-width direction. FIG. 6(A) illustrates an embodiment of the interconnecting part 5 having a W-shaped cross section, FIG. 6(B) illustrates an embodiment of the interconnecting part 5 having a U-shaped cross section, and FIG. 6(C) illustrates an embodiment of the interconnecting part 5 having a rounded W-shaped cross section. Alternatively, as illustrated in FIG. 6(D), the interconnecting part 5 may be formed in a bent or curved shape by alternately providing grooves or incisions on the top and bottom of the non-penetrating part 32. The shape of such grooves or incisions can be changed to an approximately V shape or an approximately U shape, for example. Forming the interconnecting part 5 having a cross section with alternate grooves or incisions on the top and bottom as illustrated in FIG. 6(D) makes it possible to absorb displacement due to front-back stretch and vertical shrinkage caused by a difference in thickness between the front side and the rear side, thereby suppressing a three-dimensional complicated deformation in the seat core material 1.

The interconnecting part 5 can also be vertically formed in a W shape or a U shape by rotating the bent or curved shape illustrated in FIGS. 6(A) to 6(C) by 90 degrees as illustrated in FIGS. 7(A) to 7(C).

Figure 6:
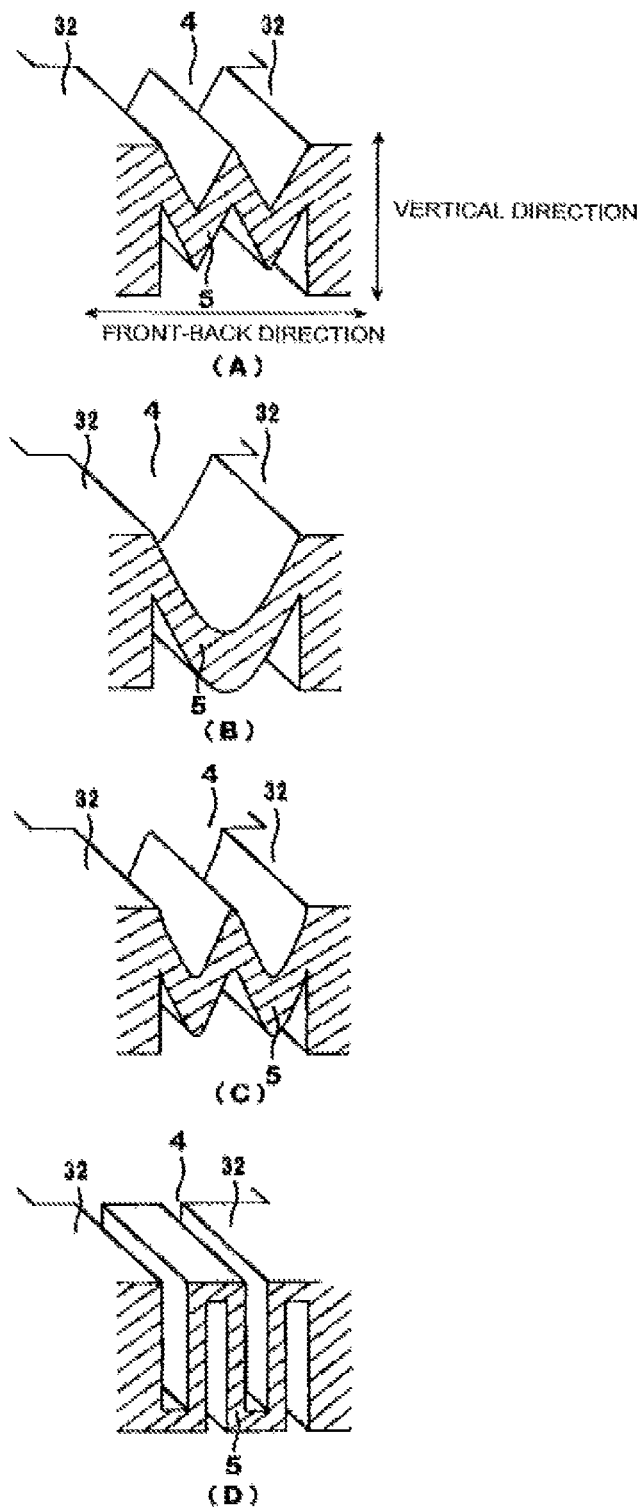
FIGS. 6(A) to 6(D) are schematic perspective views of embodiments of the interconnecting parts, illustrating cross sections of FIG. 5 taken along line A-A.
Figure 7:
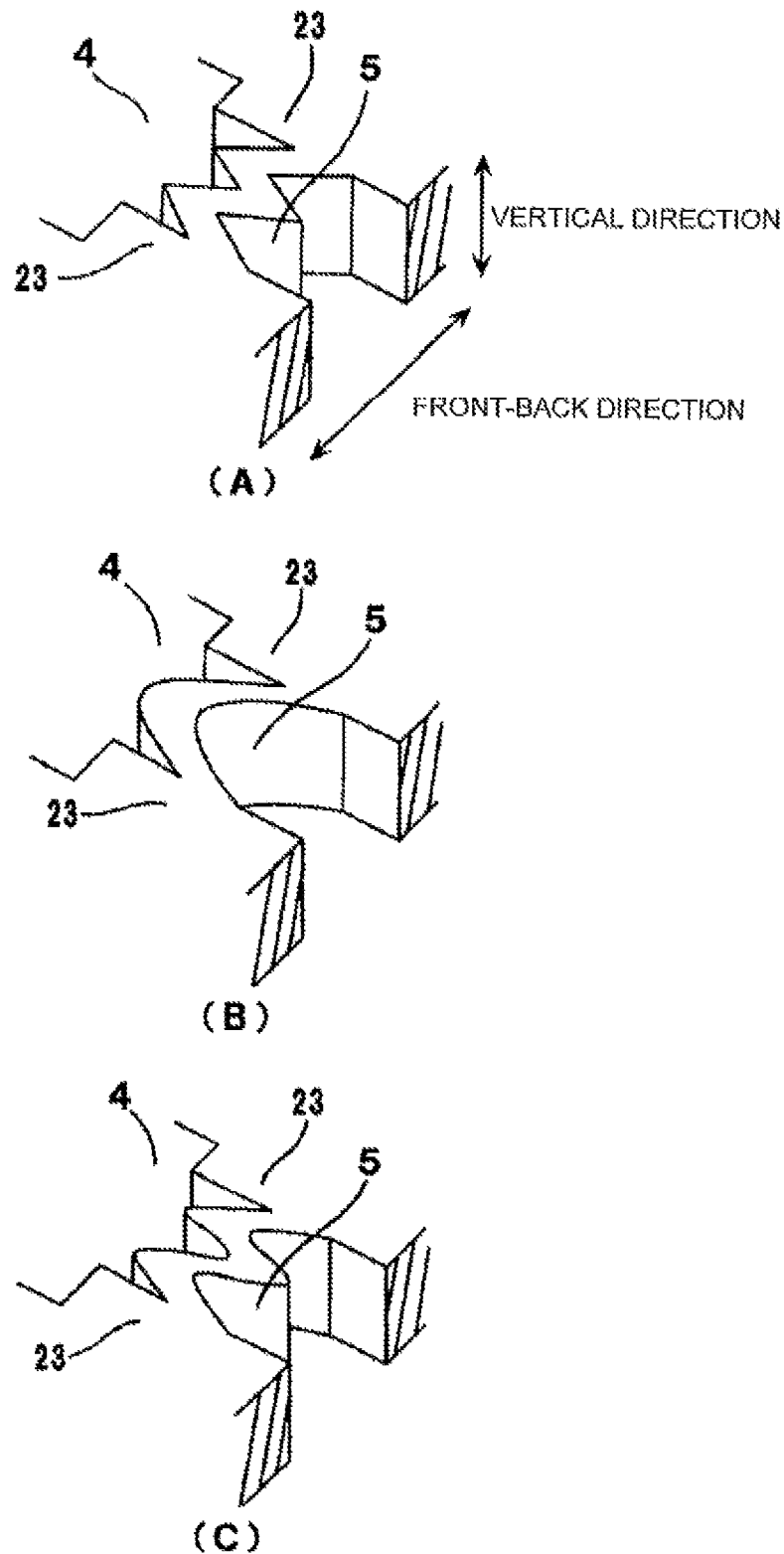
FIGS. 7(A) to 7(C) are schematic perspective views of other embodiments of interconnecting parts.

FIG. 7(A) illustrates an embodiment of the interconnecting part 5 in a bent W shape in a planar view of the non-penetrating part 32 of the slit 4, FIG. 7(B) illustrates an embodiment of the interconnecting part 5 in a curved U shape, and FIG. 7(C) illustrates an embodiment of the interconnecting part 5 in a rounded W shape. According to the embodiments of the interconnecting part 5 illustrated in FIGS. 6 and 7, the interconnecting parts 5 are stretchable in the front-back direction and can support the slit 4 to impart a sense of unity and a sufficient strength.

The width-direction minimum length of the bent or curved portion of the interconnecting part 5 is preferably 5 to 100 mm, further preferably 10 to 80 mm. With the bent or curved structure of the foregoing length, the interconnecting part 5 can effectively absorb the shrinking force and the impact force by its stretchable shape.

Figure 5:
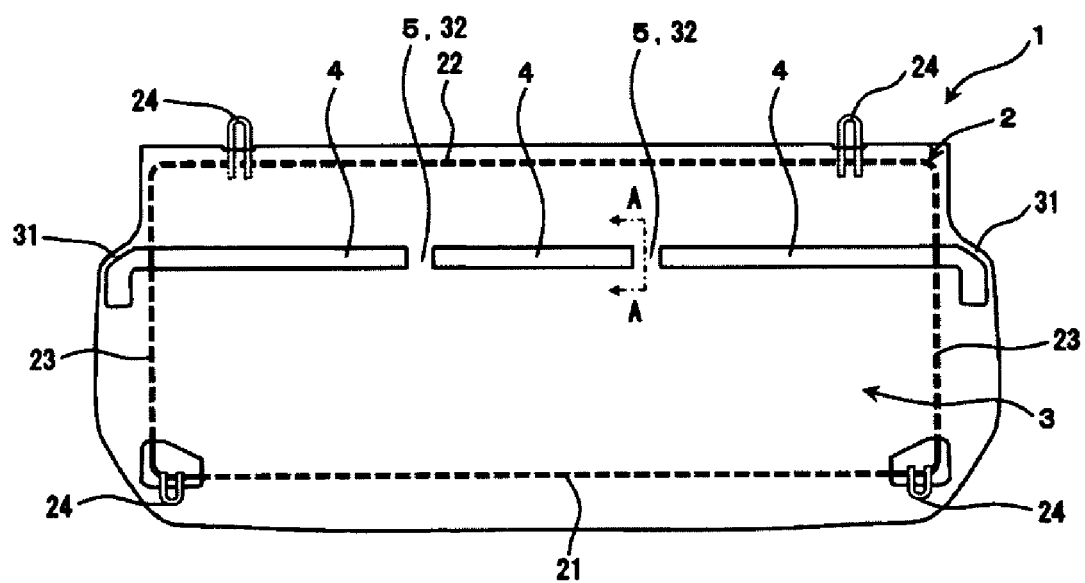
FIG. 5 is a diagram schematically illustrating an embodiment in which interconnecting parts are formed at non-penetrating part s between intermittent slits.

Without particular limitation, the number of interconnecting parts 5 can be decided as appropriate according to the number of intermittent parts of the slit 4. When three parts of the slit 4 are provided in the width direction as illustrated in FIG. 5, for example, two interconnecting parts 5 can be provided between the parts of the slit 4. Otherwise, one interconnecting part 5 can be provided between two parts of the slit 4 or three interconnecting parts 5 can be provided between four parts of the slit 4. The material for the interconnecting parts 5 is similar to that for the expanded bead article 3. However, the interconnecting parts 5 can be made from another material for adjustment of the strength or stretch amount of the interconnecting parts 5, for example.

The shape of the continuous parts 31 in the seat core material 1 of the present embodiment does not include the shapes of the interconnecting parts 5 with alternate grooves on the top and bottom in the lateral-width direction as illustrated in FIGS. 6(A) to 6(D) or the vertical W shapes or U shapes of the interconnecting parts 5 rotated by 90 degrees from the foregoing groove shapes as illustrated in FIGS. 7(A) to 7(C).

In the present invention, the continuous parts 31 play the roles of making elastic action to absorb the shrinking force of the expanded bead article 3 distributed by the slit 4 and constituting a portion of the outer peripheral edge of the core material 1 to hold the sense of unity and strength of the seat core material 1. Accordingly, in order to hold the strength of the both end portions of the expanded bead article 3, the continuous parts 31 are formed in a bent or curved shape to maintain the shape of the peripheral edges of the end portions of the seat core material 1 as much as possible.

When a plurality of slits 4 is provided, for example, the interconnecting parts 5 can be formed at the non-penetrating parts 32 of the slits 4 to assist the continuous parts 31 in absorbing the shrinking force of the seat core material 1 and holding the sense of unity and strength of the seat core material 1.

The seat core material 1 of the present embodiment is produced using a molding mold in which a male portion for forming the slit 4 is placed at a position crossing the side frame parts 23 with the continuous parts 31 of the expanded bead article 3 left intact outside the side frame parts 23. While the frame member 2 is disposed at a predetermined position in the molding mold, primarily foamed particles are charged into the molding mold and heating steam is introduced into the mold. Then, the expanded beads in the mold is heated for secondary expanding and the surface of the expanded beads is molten. Accordingly, integrated with the frame member 2, the expanded bead article 3 can be obtained by in-mold molding. In the seat core material 1 formed under a predetermined condition, the expanded bead article 3 starts to shrink from the stage of removal from the mold. However, the slit 4 formed by the mold mitigates the shrinkage of the expanded bead article 3 and suppresses the deformation. In addition, the continuous parts 31 are formed in a curved shape or a bent shape, thereby providing the seat core material 1 with a sense of unity and a sufficient strength without hindering the effect of the slit 4 mitigating the shrinkage of the expanded bead article 3.

Instead of the formation method of the slit 4 using a molding mold described above, the seat core material 1 can be formed using a conventional molding mold without a male portion for forming the slit 4. Then, in an early stage after the removal from the mold, usually within 30 minutes, more preferably within 10 minutes, the slit 4 can be formed by a method such as cutting.

EXAMPLES

Hereinafter, the seat core material of the present invention will be specifically described with reference to examples. However, the present invention is not limited to the examples.

Example 1

An annular frame member produced from an iron wire material with a diameter of 4.5 mm and a tensile strength (JIS G3532 SWM-B) of 500 N/mm$^2$ was disposed at a predetermined position in an automobile seat core material molding mold (1160 mm wide, 560 mm long, and 200 mm thick at maximum (90 mm thick at a front end portion)). Then, polypropylene expanded beads (at an appearance density of 0.024 g/cm$^3$) in the molding mold and subjected to steam heating, thereby molding a seat core material of the shape illustrated in FIG. 1.

In the steam heating, first, preliminary heating (exhaust process) is performed such that steam is supplied for five seconds into the mold in which drain valves on both sides of the mold were opened. After that, one-side heating was carried out under a pressure lower 0.08 MPa (G) than a molding steam pressure of 0.3 MPa (G), and then carried out one-side heating from the opposite direction under a pressure lower 0.04 MPa (G) than the molding steam pressure. Then, main heating was carried out from the both sides under the molding steam pressure. After completion of the heating, the mold was released from the pressure, air-cooled for 30 seconds, and water-cooled for 240 seconds, thereby obtaining a seat core material. The article density of the seat core material was 0.03 g/cm$^3$.

Then, within 10 minutes after the molding, as illustrated in FIG. 8(a), the slit 4 with a lateral width of 1050 mm and a front-back length of 40 mm was formed by a cutter knife in the width direction at a position of 300 mm from the front portion in such a manner as to cross the side frame parts 23 and to leave the continuous parts 31 of the expanded bead article 3 intact outside the side frame parts 23. In addition, the slit 4 with a width of 40 mm was also formed in the front-back direction along the peripheral edge of the expanded bead article 3 outside the side frame parts 23. The width of the expanded bead article 3 left intact outside the side frame parts 23 was 20 mm on one side. The outer end portions of the slit 4 had a bent structure. The length of peripheral edge of the expanded bead article 3 forming the bent structure was broadly 150 mm.

Example 2

In a manner similar to Example 1, a seat core material was molded. Within 10 minutes after the molding, as illustrated in FIG. 8(b), the slit 4 with a lateral width of 1050 mm and a front-back length of 40 mm was formed at a position of 300 mm from the front portion with the curved or bent parts 31 of the expanded bead article 3 between the side frame parts 23 left intact. The width of the expanded bead article 3 left intact outside the side frame parts 23 (the width of the continuous parts 31) was 20 mm on one side, and the outer end portions of the slit 4 had a bent structure. The length of the peripheral edge of the expanded bead article 3 forming the bent structure was broadly 150 mm. The slit 4 had the interconnecting parts at positions of 400 mm from the outer curved or bent parts 31. Then, the interconnecting parts 5 with vertical concave and convex portions were formed in the shape illustrated in FIG. 6(c) at the non-penetrating parts 32 of the slit 4. The interconnecting parts 5 had a front-back length of 40 mm and a width-wise length of 60 mm.

Example 3

In a manner similar to Example 1, a seat core material was molded. Within 10 minutes after the molding, as illustrated in FIG. 8(b), the slit 4 with a lateral width of 1050 mm and a front-back length of 20 mm was formed at a position of 300 mm from the front portion with the curved or bent parts 31 of the expanded bead article 3 between the side frame parts 23 left intact. The width of the expanded bead article 3 left intact outside the side frame parts 23 (the width of the continuous parts 31) was 20 mm on one side, and the outer end portions of the slit 4 had a bent structure. The length of the peripheral edge of the expanded bead article 3 forming the bent structure was broadly 130 mm.

Comparative Example 1

In a manner similar to Example 1, a seat core material was molded. The slit 4 was not formed in the molded seat core material.

Comparative Example 2

In a manner similar to Example 1, a seat core material was molded. Within 10 minutes after the molding, the one rectangular slit 4 with a front-back length of 10 mm was formed by a cutter knife at a position of 360 mm from the front portion and 140 mm from the width-wise end portion in such a manner as to cross the portions between the side frame parts 23. The seat core material was completely partitioned by the slit 4.

The seat core materials in the examples and the comparative examples produced under the conditions described above were cured for 12 hours at an atmosphere of 60° C. and slowly cooled. Then, the dimension deformation amounts of the seat core material at the positions (1) to (4) on the rear side illustrated in FIGS. 8(*a*) and 8(*b*). The dimension as a reference for measurement of the deformation amount was the front-back dimension at the designed measurement positions, specifically the dimension of the molding mold (560 mm).

The strength of each of the obtained seat core materials was measured and evaluated by the method described below. The front side of the seat core material was fixed, the rear-side center portion of the seat core material was pulled to the rear side by a tensile force of 10 N, and the amount of displacement of the rear-side center portion was measured. Table 1 shows the measurement results.

TABLE 1

|  |  | Example 1 | Example 2 | Example 3 | Comparative Example 1 |
|---|---|---|---|---|---|
| Slit length (mm) | | 1050 | 1050 | 1050 | — |
| Slit front-back length (mm) | | 40 | 40 | 20 | — |
| Presence or absence of interconnecting parts | | Absence | Presence | Absence | Absence |
| Opening area (%) | | 17 | 16.5 | 10 | — |
| Slit length ratio (l/L) (%) | | 96 | 96 | 96 | — |
| Dimension change (mm) | Position (1) illustrated in FIG. 8 | −3 | −7 | −3 | −11 |
| | Position (2) illustrated in FIG. 8 | −1.5 | −6.5 | −3 | −11 |
| | Position (3) illustrated in FIG. 8 | −2 | −7 | −2.5 | −10 |
| | Position (4) illustrated in FIG. 8 | −1.5 | −5 | −2 | −11 |
| Strength evaluation (displacement amount) (mm) | | 4 | 2 | 4 | 0 |

It can be seen from the results in Table 1 that the deformation amounts of the seat core materials in Examples 1, 2 were small. The seat core material with the interconnecting parts 5 in Example 2 had a significantly small deformation amount with improved strength, as compared to the seat core material without the interconnecting parts 5 in Example 1.

It has been confirmed from these results that forming the continuous parts outside the side frame parts and providing the interconnecting parts makes it possible to obtain a seat core material that is more increased in a sense of unity and rigid impression without hindering the effect of the slits relieving the shrinkage of the expanded bead article.

The invention claimed is:

1. A seat core material for vehicle comprising: a thermoplastic resin expanded bead article and a frame member embedded in a peripheral edge portion of the expanded bead article, wherein
the frame member includes a front frame part, a rear frame part, and two side frame parts interconnecting the front frame part and the rear frame part,
a first slit crossing the two side frame parts is formed along a longitudinal direction of the expanded bead article with continuous parts of the expanded bead article left intact outside the side frame parts on both left and right end portions of the expanded bead article,
the first slit at least partially penetrates the expanded bead article in a thickness direction,
the continuous parts are formed in a curved shape or a bent shape along a peripheral edge of the expanded bead article as viewed from the top,
the expanded bead article has a peripheral edge shape that narrows in a vehicle-width direction at increasingly rearward positions on a rear side of the expanded bead article, and
auxiliary slits are formed at least partially penetrating the expanded bead article in the thickness direction, respectively, in the expanded bead article outside the side frame parts forward from the longitudinal outer end portions of the first slit, wherein the auxiliary slits intersect the first slit in the front-back direction extend adjacent and follow the increasingly rearward positions in a contour that forms the narrowed shape at the width-wise outer end portions of the first slit and at least in part form the left and right end portions of the expanded bead article in the bent or curved shape.

2. The seat core material according to claim 1, wherein the expanded bead article has an auxiliary slit penetrating or not penetrating in the thickness direction outside the side frame parts forward from longitudinal end portions of the slit.

3. The seat core material according to claim 1, wherein a ratio of opening area of the slit is 25% or less of a projection area of the expanded bead article in top view of the seat core material in a mounted state.

4. The seat core material according to claim 1, wherein a non-penetrating part of the slit has an interconnecting part in which a bend or curved shape is repeatedly formed.

5. The seat core material according to claim 1, wherein a front-back length of the slit is 10 to 40 mm.

6. The seat core material according to claim 1, wherein a minimum thickness of each of the continuous parts is 10 to 50 mm, and a front-back length of each of the continuous parts is 50 to 200 mm.

7. The seat core material according to claim 1, wherein the slit has a length of 100 mm or more from the outer end portion in the vehicle-width direction, and is formed continuously in the vehicle-width direction.

8. The seat core material according to claim 1, wherein each of the continuous parts is formed at a portion of 60 to 80% from the front end portion of the expanded bead article with respect to a front-back length of the center portion of the expanded bead article.

9. The seat core material according to claim 1, wherein each of the continuous parts is formed at a part where is from the front-back center portion of the expanded bead article to the rear frame part.

10. The seat core material according to claim 1, wherein a thickness Tf of a front end portion of the seat core material and a thickness Tr of a rear end portion of the seat core material are in the relationship Tr×1.5<Tf.

* * * * *